(12) United States Patent
Smith

(10) Patent No.: US 7,350,846 B2
(45) Date of Patent: Apr. 1, 2008

(54) TARPAULIN SYSTEM FOR COVERING AN OPEN-TOPPED CONTAINER

(75) Inventor: Fred P. Smith, Alpine, UT (US)

(73) Assignee: Smith Patents, L.L.C., Alpine, UT (US)

( * ) Notice: Subject to any disclaimer, the term of this patent is extended or adjusted under 35 U.S.C. 154(b) by 209 days.

(21) Appl. No.: 11/210,414

(22) Filed: Aug. 24, 2005

(65) Prior Publication Data

US 2006/0043754 A1 Mar. 2, 2006

Related U.S. Application Data

(60) Provisional application No. 60/604,070, filed on Aug. 24, 2004.

(51) Int. Cl.
*B60P 7/02* (2006.01)

(52) U.S. Cl. .............. 296/100.01; 296/98; 296/100.17; 296/100.18

(58) Field of Classification Search ........... 296/98, 296/100.01, 100.02, 100.03, 100.17, 101, 296/100.18
See application file for complete search history.

(56) References Cited

U.S. PATENT DOCUMENTS

| | | | |
|---|---|---|---|
| 2,591,186 A | 4/1952 | Neitzke | |
| 2,594,910 A | 4/1952 | Germann | |
| 3,467,431 A | 9/1969 | Turcotte | |
| 3,498,666 A | 3/1970 | Harrawood | |
| 3,515,428 A | 6/1970 | Killion | |
| 3,549,197 A | 12/1970 | Sibley | |
| 3,549,198 A | 12/1970 | Capello | |
| 3,549,199 A | 12/1970 | Sibley | |
| 3,628,826 A | 12/1971 | Sibley | |
| 3,759,568 A | 9/1973 | Unruh | |
| 3,774,958 A | 11/1973 | Thorpe | |
| 3,854,770 A | 12/1974 | Grise et al. | |
| 3,868,142 A | 2/1975 | Bachand et al. | |
| 3,977,719 A | 8/1976 | Thurston | |
| 4,023,857 A | 5/1977 | Killion | |
| 4,030,780 A | 6/1977 | Petretti | |
| 4,046,416 A | 9/1977 | Penner | |
| 4,050,734 A | 9/1977 | Richard | |
| 4,082,347 A | 4/1978 | Petretti | |
| 4,126,351 A | 11/1978 | Peteretti | |
| 4,341,416 A | 7/1982 | Richard | |
| 4,516,802 A | 5/1985 | Compton | |
| 4,529,098 A | 7/1985 | Heider et al. | |
| 4,842,323 A | 6/1989 | Trickett | |
| 4,874,196 A | 10/1989 | Goldstein et al. | |

(Continued)

*Primary Examiner*—Lori L. Lyjak
(74) *Attorney, Agent, or Firm*—Sand & Sebolt

(57) ABSTRACT

A tarpaulin system for covering an open top container typically mounted on a truck includes a four-bar linkage wherein one of the bars is extendable and typically a first linear actuator. A tarpaulin is windingly mounted on the linkage and a second actuator is connected to the four-bar linkage in order to provide primary movement of the linkage. The tarpaulin is movable between a stowed position between the cab of a truck and the front of the container to a deployed position adjacent the rear of the container in order to cover the open top of the container. The four-bar linkage allows the tarpaulin to move from the stowed axis Forwardly toward the cab and upwardly above the container by operation of the second actuator without use of the first actuator.

31 Claims, 15 Drawing Sheets

U.S. PATENT DOCUMENTS

| | | |
|---|---|---|
| 4,893,864 A | 1/1990 | Bailey |
| 4,909,563 A | 3/1990 | Smith |
| 4,981,317 A | 1/1991 | Acosta |
| 5,031,955 A | 7/1991 | Searfoss |
| 5,054,840 A | 10/1991 | Wilhite |
| 5,058,956 A | 10/1991 | Godwin, Sr. |
| 5,125,713 A | 6/1992 | Willingham et al. |
| 5,180,203 A | 1/1993 | Goudy |
| 5,218,743 A | 6/1993 | Miller |
| 5,238,287 A | 8/1993 | Haddad, Jr. |
| 5,240,303 A | 8/1993 | Hageman |
| 5,292,169 A | 3/1994 | O'Brian |
| 5,328,228 A | 7/1994 | Klassen |
| 5,337,818 A | 8/1994 | Coad |
| 5,340,187 A | 8/1994 | Haddad, Jr. |
| 5,354,113 A | 10/1994 | Pettersson |
| 5,380,058 A | 1/1995 | Short et al. |
| 5,388,882 A | 2/1995 | Russell et al. |
| 5,482,347 A | 1/1996 | Clarys et al. |
| 5,547,243 A | 8/1996 | Lamb et al. |
| 5,549,347 A | 8/1996 | Anderson |
| 5,573,295 A | 11/1996 | Haddad, Jr. |
| 5,697,663 A | 12/1997 | Chenowth |
| 5,743,700 A | 4/1998 | Wood, Jr. et al. |
| 5,752,735 A | 5/1998 | Fleming et al. |
| 5,762,002 A | 6/1998 | Dahlin et al. |
| 5,765,901 A | 6/1998 | Wilkens |
| 5,803,528 A | 9/1998 | Haddad, Jr. |
| 5,823,604 A | 10/1998 | Chenowth |
| 5,829,818 A | 11/1998 | O'Daniel |
| 5,829,819 A | 11/1998 | Searfoss |
| RE36,135 E | 3/1999 | O'Brian |
| 5,882,062 A | 3/1999 | Chenowth |
| 5,887,937 A | 3/1999 | Searfoss |
| 5,924,758 A | 7/1999 | Dimmer et al. |
| 5,944,374 A | 8/1999 | Searfoss |
| 6,053,556 A | 4/2000 | Webb |
| 6,089,645 A | 7/2000 | Haddad, Jr. |
| 6,109,680 A | 8/2000 | Horner et al. |
| 6,142,553 A | 11/2000 | Bodecker |
| 6,199,935 B1 | 3/2001 | Waltz et al. |
| 6,206,448 B1 | 3/2001 | Haddad, Jr. |
| 6,220,646 B1 | 4/2001 | Merino Lamela |
| 6,237,985 B1 | 5/2001 | O'Brian |
| 6,250,709 B1 | 6/2001 | Haddad, Jr. |
| 6,273,490 B1 | 8/2001 | Haddad, Jr. |
| 6,318,790 B1 | 11/2001 | Henning |
| 6,338,521 B1 | 1/2002 | Henning |
| 6,695,382 B2 * | 2/2004 | Ciferri et al. ............... 296/98 |
| 6,742,828 B2 | 6/2004 | Smith |
| 6,974,176 B2 * | 12/2005 | Smith et al. ............... 296/98 |
| 7,111,891 B2 * | 9/2006 | O'Brian et al. ............... 296/98 |
| 2005/0242612 A1 * | 11/2005 | O'Brian et al. ............... 296/98 |

* cited by examiner

TARPAULIN SYSTEM FOR COVERING AN OPEN-TOPPED CONTAINER

CROSS-REFERENCE TO RELATED APPLICATIONS

This application is a standard utility application claiming priority from U.S. Provisional Application No. 60/604,070, filed Aug. 24, 2004, the entire disclosure of which is incorporated herein by reference.

BACKGROUND OF THE INVENTION

1. Technical Field

The invention relates generally to a system for covering open top containers. More particularly, the invention relates to such a device which is mountable on a truck which includes an open top container. Specifically, the invention relates to such a device which utilizes a four-bar linkage in order to move a tarpaulin to cover the open top container.

2. Background Information

Large open containers are generally used for the purpose of transporting loose material, such as refuse, aggregates, construction debris or the like. In one application, these containers may be transported on large roll-off trucks, which allows for loading and unloading at different locations. These containers have an open top to allow for easy insertion of materials. Laws and regulations have been adopted in many areas specifying that these containers need to be covered during transit on public roadways to prevent material from being be blown out of the containers. Even where laws do not require this, it is beneficial to cover these containers in order to prevent damage to property from material that can be blown out during transport. These containers typically range in heights from 3 to 8 feet, and typically range in length from 14 to 24 feet. While it is possible to manually cover these containers, it is time consuming and expensive. The considerable variation in height and length of these containers complicate automatic tarping mechanisms.

Several inventions have been created to facilitate the automatic tarping of open top containers. One such device is depicted in U.S. Pat. No. 5,829,818. The device of the '818 patent provides two arms mounted with a cross beam and a spring-loaded roll of tarp material between one end of each arm and the other end of each arm pivotally affixed to the truck. The arms move through a fixed arc pulling a tarp over the top of the container as the arms move from the front to the rear of the container. The primary disadvantage of this invention is that it is difficult to accommodate various container sizes with the fixed length arms. Although, short containers could be covered by letting the tarp roller hang past the rear edge of the container, the dynamic loads on the overhanging weight could be damaging to the arms and pivots. Also, the weight of the arms and roller pulling the tarp over the rear edge of the container causes premature wear of the tarp material Two approaches to create a covering device able to better adapt to various sized containers are shown in U.S. Pat. No. Re. 36,135 and U.S. Pat. No. 5,803,528. The invention of the '135 patent utilizes jointed arms, with a cylinder between the two arm sections. The base of each arm is mounted to the truck. The distal end of each arm supports the tarp roller. Actuating the cylinder between the two arm sections bends the arm at the joint, changing the distance between the base end and the tarp roller. The base arm is rotated by a cylinder attached to the truck on one end and the base arm on the other. The design of the '528 patent uses an actuated slider mechanism to vary the length of the tarp supporting arms. Both approaches offer effective methods of positioning the tarp at the rear edges of various container sizes. One of the disadvantages of both of the aforementioned systems relates to the initial movement of the tarp from its stowed position between the cab of the truck and the container. Most container tarpaulin systems store the cover or tarpaulin behind the cab of the truck and deploy the tarpaulin by raising it above the container on the truck frame and pulling the tarpaulin over the top of the container. It is desirable to have the tarp roller stored nearly at or below the height of the cab to lower wind resistance. Since many of the containers when sitting on the truck are substantially taller than the cab of the truck, the initial motion of the tarping mechanism must lift the tarp roller essentially straight up in between the cab and the front of the container in what is typically a narrow space. The converse is true when storing the tarp roller. If the initial motion is arcuate, the tarp roller will collide with either the cab or the container. Given that most tarpaulin systems or tarpers, including the aforementioned patented art, rotate or pivot, this straight line motion is only achieved by manipulating the arm length while simultaneously rotating the tarp carrying arms. Achieving the straight-line motion becomes a function of operator skill and often results in collisions between the tarper and the container, cab, or both.

Another disadvantage to U.S. Pat. No. 5,803,528 is that sliding motion is typically more expensive to fabricate and maintain. Grease is often used to facilitate sliding and is exposed on the extending part that the operator can touch. This can be a messy problem for the operator.

A further disadvantage with the aforementioned prior art is that a portion of the arm/arms of the tarping systems may extend above the top of the container for some or all container sizes when the tarp is deployed. This exposes the arms to damage from low tree limbs and the like. Additionally, the extending portion of the arms may pose a problem with regard to regulated height restrictions for the truck/container combinations when covering the tallest of typical containers.

A third approach taken to covering different sized open top containers is illustrated in U.S. Pat. No. 6,742,828. The '828 patent shows a device with two pivoted arm sections, which are controlled by actuators and sprockets. The first actuator controls the lower pivot arm, while a sprocket and gear assembly drives the upper pivot arm, which is controlled by a second actuator. This container covering device is comparatively complex and has a high part count. With an increase in complexity there is also an increase in cost of manufacturing and assembly. A further disadvantage of the '828 patent is that the lower arm section and upper arm section must stack laterally across the width of the truck. That is, the arms must be out of plane to avoid interference. In light of regulations governing the overall width of equipment such as tarpaulin systems or tarpers, an optimum design would minimize the width of the tarper mechanism and allow for the arms and its various sections to be in more or less the same plane. The stacking of the lower and upper arm in the '828 patent uses width that would ideally be used to provide clearance for the container or allow for wider containers to fit within the tarper system.

The purpose of the present invention is to provide a container covering device that addresses the deficiencies presented in the prior art.

BRIEF SUMMARY OF THE INVENTION

A tarpaulin system for covering an open top container typically mounted on a truck includes a four-bar linkage wherein one of the bars is extendable and typically a first linear actuator. A tarpaulin is windingly mounted on the linkage and a second actuator is connected to the four-bar linkage in order to provide primary movement of the linkage. The tarpaulin is movable between a stowed position between the cab of a truck and the front of the container to a deployed position adjacent the rear of the container in order to cover the open top of the container. The four-bar linkage allows the tarpaulin to move from the stowed axis Forwardly toward the cab and upwardly above the container by operation of the second actuator without use of the first actuator.

BRIEF DESCRIPTION OF THE SEVERAL VIEWS OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

Figure 1:
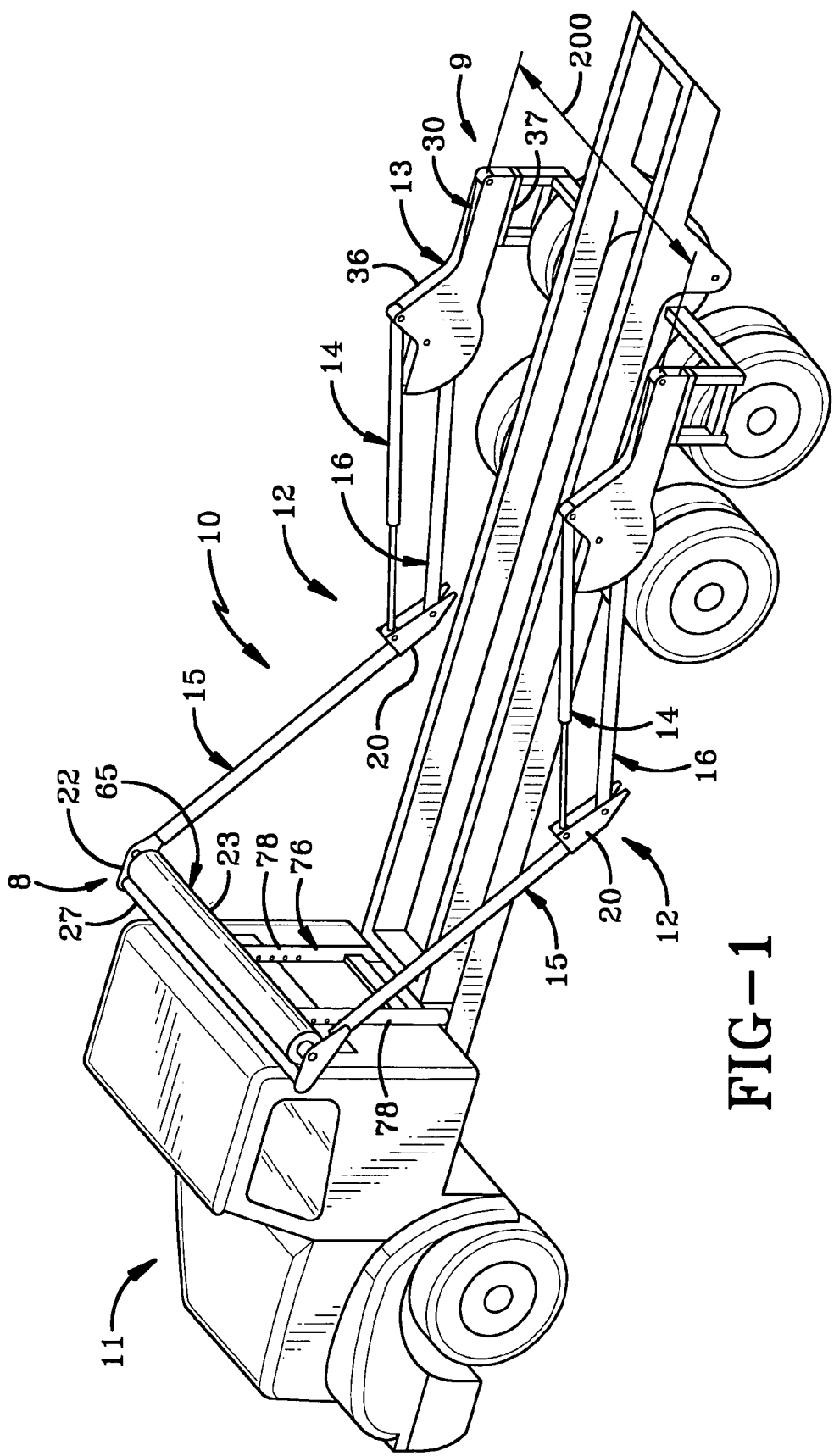
FIG. 1 is an isometric view of a preferred embodiment of a tarpaulin system on a typical roll-off truck in accordance with the present invention.

The figures referred to above are not necessarily drawn to scale and should be understood to be representative of the invention, illustrating the principles involves. The same numbers have been used in the drawings to depict items that are duplicate or identical as shown in the various embodiments. Those of ordinary skill in the art will, of course, appreciate and that various modifications may easily be made without departing from the essential characteristics of the invention.

DETAILED DESCRIPTION OF THE INVENTION

It will be readily understood that the components of the present invention, as generally described and illustrated in the FIGS. 1-14 herein, could be arranged and designed in a wide variety of different configurations. While the embodiment shows the present invention mounted on a roll-off truck and container, it may be adapted to cover other open containers mounted on trucks, and or other vehicles, e.g., dump trucks, and is considered to be within the scope of this invention.

Referring to FIGS. 1-9, a tarpaulin system for a truck is disclosed and generally indicated at 10. Tarpaulin system 10 has a front end 8 and a rear end 9 and comprises a pair of side assemblies 12, a tarpaulin-deploying assembly in the form of a tarpaulin roller 65 and a linkage actuator 30 for activating system 10. The side assemblies 12 are separated by a distance 200 that is sufficient to clear a container 60 (FIGS. 6) placed on truck 11 as side assemblies 12 move through their designed path of travel. Tarpaulin roller 65 draws a tarpaulin 23 (FIG. 2B) over the top of container 60 to cover a load held therein.

In accordance with a specific feature of the present invention, each side assembly 12 comprises a four-bar linkage composed of a mounting base 13, a first arm 16, a second arm 14, and a tarpaulin arm 15. Side assemblies 12 are designed to move tarpaulin roller 65 forwardly toward the cab 62 of truck 11 and to lift the roller 65 vertically so that it can more easily clear a front top edge 82 (FIG. 6) of container 60. The forward motion of side assemblies 12 reduces the stresses on the components in the system, moves the roller 65 slightly closer to cab 62 so that there is more room for the roller 65 to be maneuvered and allows for a gentle arc by roller 65 to miss the upper front corner of container 60.

Figure 2A:
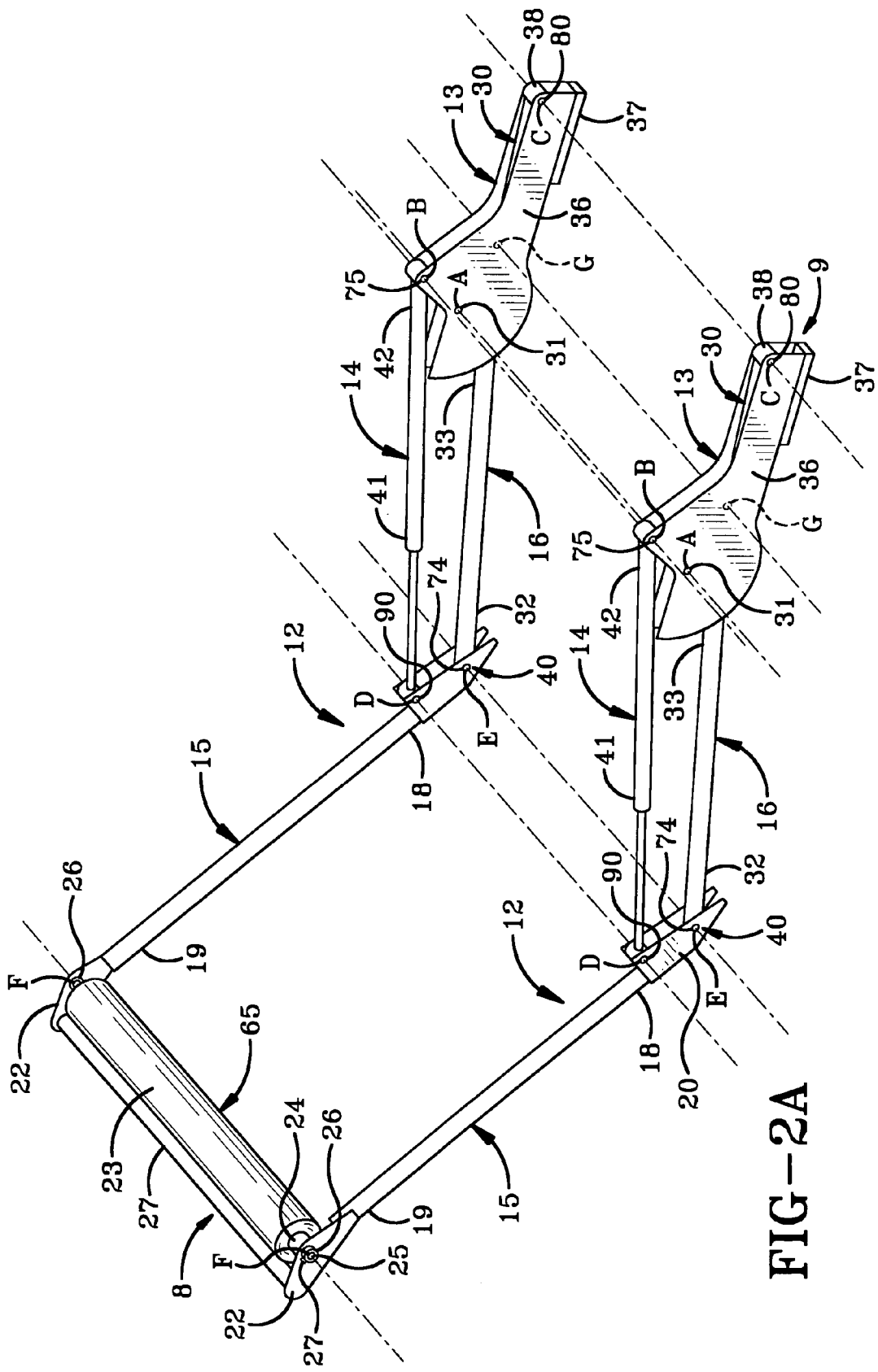
FIG. 2A is an isometric view of the tarpaulin system with the truck removed for clarity.
Figure 3:
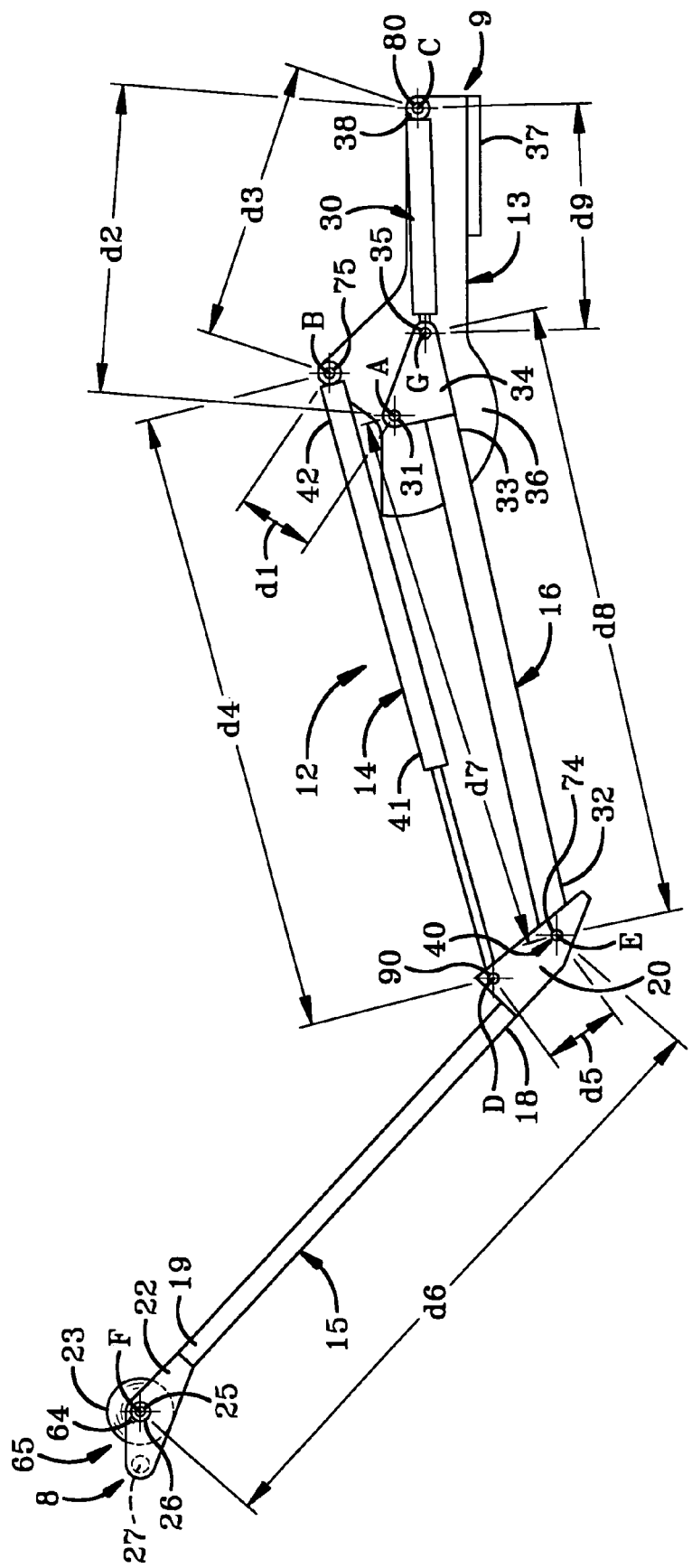
FIG. 3 is a side elevation view of the side assembly of the tarpaulin system.

Referring now to FIGS. 2A and 3, each first arm 16 is pivotally mounted to its respective mounting base 13 by way of a pivot pin 31 which constitutes a first pivot A. Similarly, each second arm 14 is pivotally mounted to the respective mounting base 13 by way of a pivot pin 75 which constitutes a second pivot B. First pivot A and second pivot B are disposed a fixed distance d1 apart. Tarpaulin arm 15 is pivotally mounted to first arm 16 by way of a pin 74 which constitutes a third pivot E. Tarpaulin arm 15 is also pivotally mounted to second arm 14 by way of a pin 90 which constitutes a fourth pivot D. Tarpaulin arm 15 is further mounted to tarpaulin roller 65 by way of a cross shaft 25 which has an axis F about which shaft 25 rotates. Third and fourth pivots E, D are spaced a fixed distance d5 apart and third pivot E and axis F are spaced a fixed distance d6 apart. The distance d6 is substantially greater than the distance d5. Thus fourth pivot D is disposed intermediate third pivot E and axis F.

Second arm 14 is adjustable in length in that it is a linear actuator, and more specifically a hydraulic cylinder. Consequently, second pivot B and fourth pivot D are disposed a variable distance d4 apart. The retraction of second arm 14 moves fourth pivot D closer to second pivot B and the extension of second arm 14 moves fourth pivot D further away from second pivot B.

Linkage actuator 30 is pivotally mounted to first arm 16 by way of a pin 35 (FIG. 3) which constitutes an actuator pivot G. Linkage actuator 30 is further pivotally mounted to mounting base 13 by way of a pin 80 which constitutes a base pivot C. First pivot A and base pivot C are a fixed distance d2 apart. Second pivot B and base pivot C are a fixed distance d3 apart. First pivot A and third pivot E are disposed a fixed distance d7 apart and third pivot E and actuator pivot G are disposed a fixed distance d8 apart. Distance d8 is somewhat longer than distance d7, indicating that first pivot A is disposed intermediate third pivot E and actuator pivot G. Base pivot C and actuator pivot G are disposed a variable distance d9 apart because linkage actuator 30 is a hydraulic cylinder. When linkage actuator 30 is retracted, base pivot C and actuator pivot G are disposed closer to each other and when linkage actuator 30 is extended, actuator pivot G is disposed further from base pivot C. Thus, actuator pivot G is movable toward and away from base pivot C by linkage actuator 30.

The four-bar linkage of tarpaulin system 10 is therefore pivotally interconnected at the four pivots, namely first pivot A, second pivot B, third pivot E and fourth pivot D. When system 10 is activated by linkage actuator 30, first arms 16 pivot about an axis extending between first pivots A-A; second arms 14 pivot about an axis extending through second pivots B-B; and tarpaulin arm 15 pivots about axes extending through third and fourth pivots E-E and D-D. The axes A-A, B-B, E-E and D-D all lie substantially parallel to each other. Pivots A, B, E and D define a four-sided geometric shape which is altered during the operation of linkage actuator 30 and/or second arm 14. Extension or retraction of actuator 30 causes first arm 16 to pivot about first pivot A, which causes tarpaulin arm 15 to pivot on third and fourth pivots E, D and second arm 14 to pivot about second pivot B. Extension or retraction of second arm 14 causes tarpaulin arm 15 to pivot with respect to first arm 16 about 13 pivot E. Second arm 14 therefore acts as a first actuator for pivoting tarpaulin arm 15 about third pivot E. Furthermore, an axis of rotation G-G extends between the two actuator pivots G of the two side assemblies 12. Axis G-G lies substantially parallel to the axis of rotation A-A extending between first pivots A and the axis of rotation B-B extending between the second pivots B. The third pivot E and actuator pivot G are movable about first pivot A during operation of linkage actuator 30.

Figure 2B:
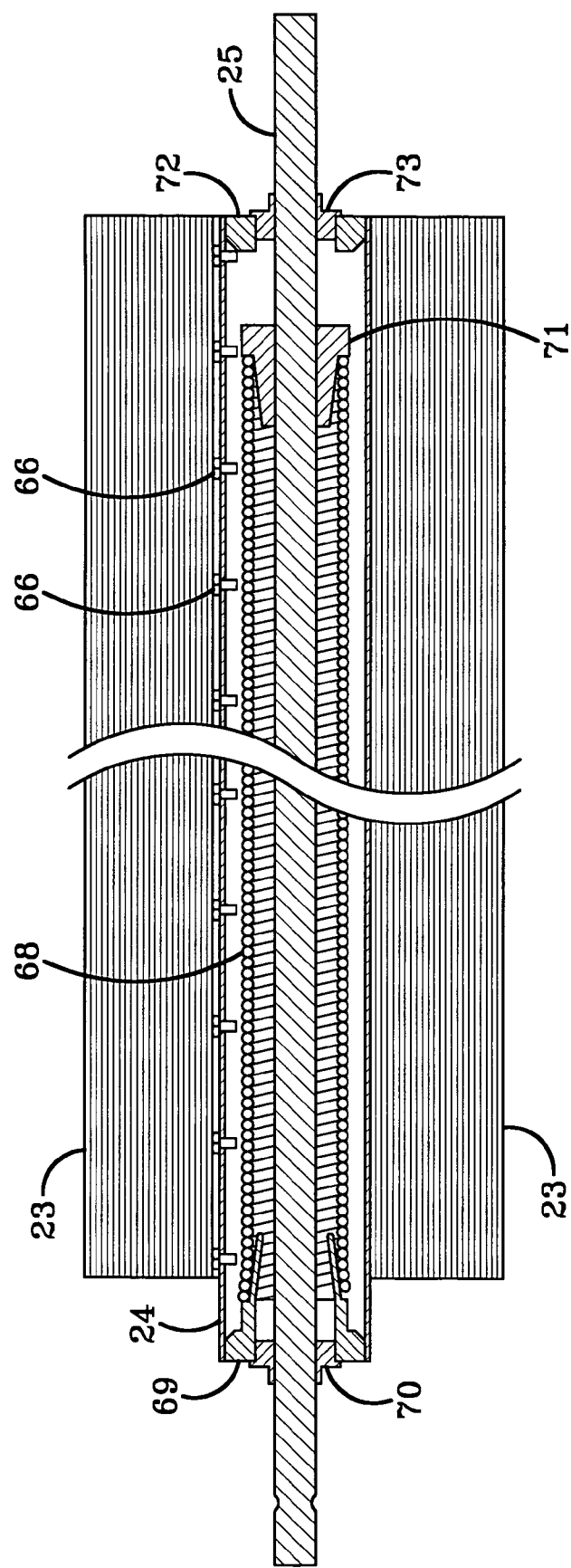
FIG. 2B is an enlarged cross-sectional view of the roller assembly of FIG. 2A.

In the preferred embodiment of the invention, tarpaulin arm 15 and first arm 16 are long tubular members. Tarpaulin arm 15 includes a pivot plate 20 rigidly connected to the respective tubular member adjacent a first end 18 of tarpaulin arm 15. Pivot plate 20 is pivotally connected to second arm 14 at fourth pivot D and pivotally connected to first arm 16 at third pivot E. Tarpaulin arm 15 further includes a roller plate 22 rigidly connected to the respective tubular member adjacent a second end 19 of tarpaulin arm 15. Roller assembly 65, as shown in FIG. 2B, is well known in the art. Roller assembly 65 is supported on cross shaft 25 which is received into roller collars 26 that are fixedly attached to each of roller plates 22. Cross shaft 25 may be secured to one or both of roller collars 26 by means of shaft bolt 64. Cross shaft 25 lies substantially parallel to the axes of rotation A-A, B-B, E-E and D-D.

With reference to FIG. 2B, deployable tarpaulin 23 is secured to roller 24 by means of fasteners 66 or alternatively may have a loop sewn around a rod on the end. This loop and rod may mate with a corresponding channel in the roller 24. Tarpaulin 23 is a flexible material such as nylon, canvas, polyester, polyethylene or other material suitable for keeping the contents within the container 60. Other suitable materials for tarpaulin 23 are readily apparent to those skilled in the art, given the benefit of this disclosure. Tarpaulin 23 is wound onto roller 24. The other end of tarpaulin 23 is fastened to a pedestal 76 (FIGS. 1 and 6) that is mounted to the truck frame. A torsion member 27 (FIG. 2A) is rigidly connected to roller plates 22. Said torsion member 27 serves to assist in synchronizing the movement of tarpaulin arms 15 and to stabilize the side-to-side motion of the roller 24. Roller 24 is spring biased, similar to a window shade, by a torsion spring 68 to tension tarpaulin 23 between roller 24 and pedestal 76 during the deployment of tarpaulin 23. Torsion spring 68 is connected to an end cap 69 of roller 24. A bearing 70 is inserted into end cap 69 allowing roller 24 to rotate about cross shaft 25 of system 10. The other end of torsion spring 68 is attached to a spring nut 71 which, in turn, is locked onto cross shaft 25. The other end of roller 24 is closed off by endcap 72. A bearing 73 is inserted into endcap 72 allowing roller 24 to rotate about cross shaft 25.

In alternative embodiments of the present invention, roller assembly 65 may be mounted to truck 11 with a free end of tarpaulin 23 connected directly to cross shaft 25. Tarpaulin 23 is unrolled from the roller 24 as the side assemblies 12 move along the container.

Referring now to FIG. 3, a more detailed look at the side assembly 12 shows that the joint end 32 of first arm 16 is pivotally connected to first end 18 of tarpaulin arm 15 by pin 74, which constitutes the third pivot E. The base end 33 of first arm 16 is pivotally connected to the mounting base 13 by pin 31, which constitutes first pivot A. Rotation plates 34 are integral to first arm 16 at its base end 33 and allow for pivotal connections to mounting base 13 at pin 31 and to linkage actuator 30 by pin 35. Linkage actuator 30 is pivotally connected at base pivot C to mounting base 13 at its base end 38 and to first arm 16 at actuator pivot G. Linkage actuator 30 thereby acts as a second actuator which extends between actuator pivot G and base pivot C. Linkage actuator 30 causes first arm 16 to rotate about first pivot A. Linkage actuator 30 is a linear actuator, but it is understood that other types of actuators such as rotational or a second 4-bar linkage arrangement could also be used. In the preferred embodiment of the present invention mounting base 13 consists of one or more support plates 36 and a mounting member 37. Support plates 36 are pivotally connected to second arm 14, first arm 16, and linkage actuator 30 by pin 75, pin 31 and pin 80 respectively. Support plates 36 straddle second arm 14, first arm 16, and linkage actuator 30. Mounting member 37 connects support plates 36 and may be used to mount mounting base 13 to the frame of a truck 11 or any other structure.

Figure 4:
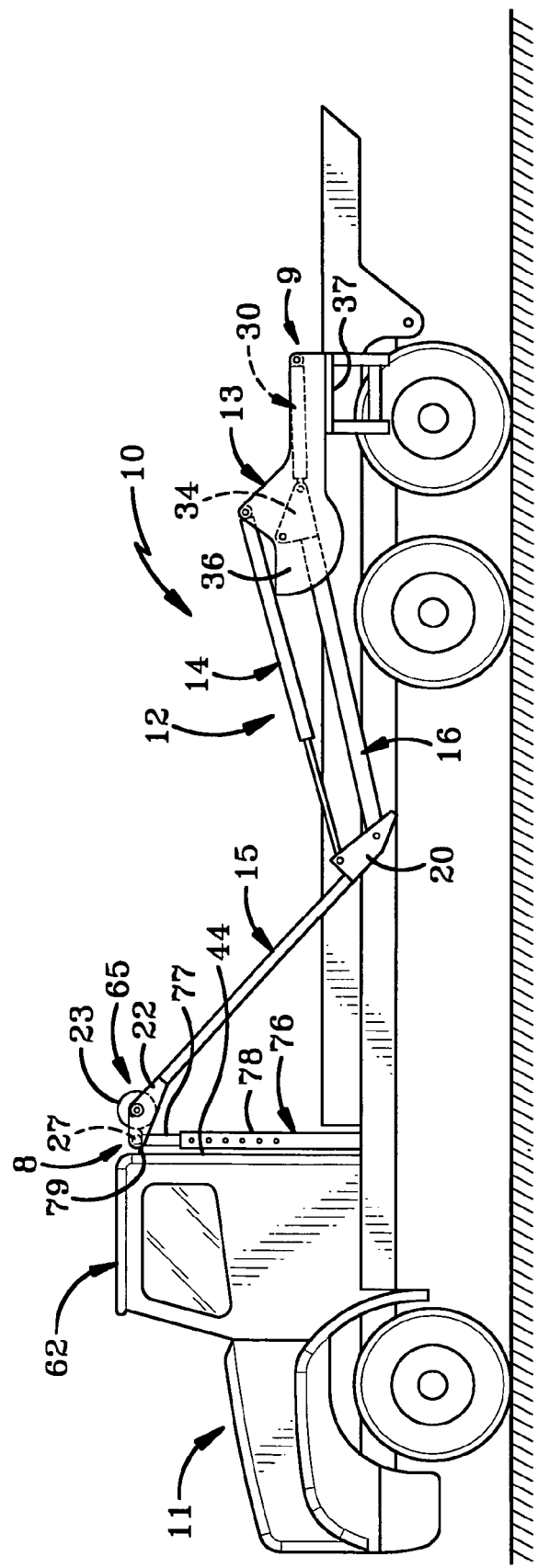
FIG. 4 is a side elevation view of the tarpaulin system mounted on the truck when a container is not placed thereon.

Referring now to FIG. 4, tarpaulin 23 is stowed behind cab 62 of truck 11. Torsion member 27 (FIG. 2A) may be supported by pedestal 76 when tarpaulin 23 is in a stowed position. Alternatively, roller 24 and tarpaulin 23 may be supported directly on pedestal 76. The vertical portion of pedestal 76 may consist of a pair of inner tubes 77 that extend from within a pair of outer tubes 78. A bolt is received within the through holes in inner tubes 77 and outer tubes 78 so as to adjust the height of pedestal 76. Pedestal 76 support serves to alleviate the dynamic loads on tarpaulin system 10 when truck 11 is in motion. A tray 79 (FIGS. 6 and 8) extending the width of tarpaulin 23, across the top of inner tubes 77, serves to support tarpaulin system 10 and provides a convenient place to fasten one end of tarpaulin 23.

Figure 5:
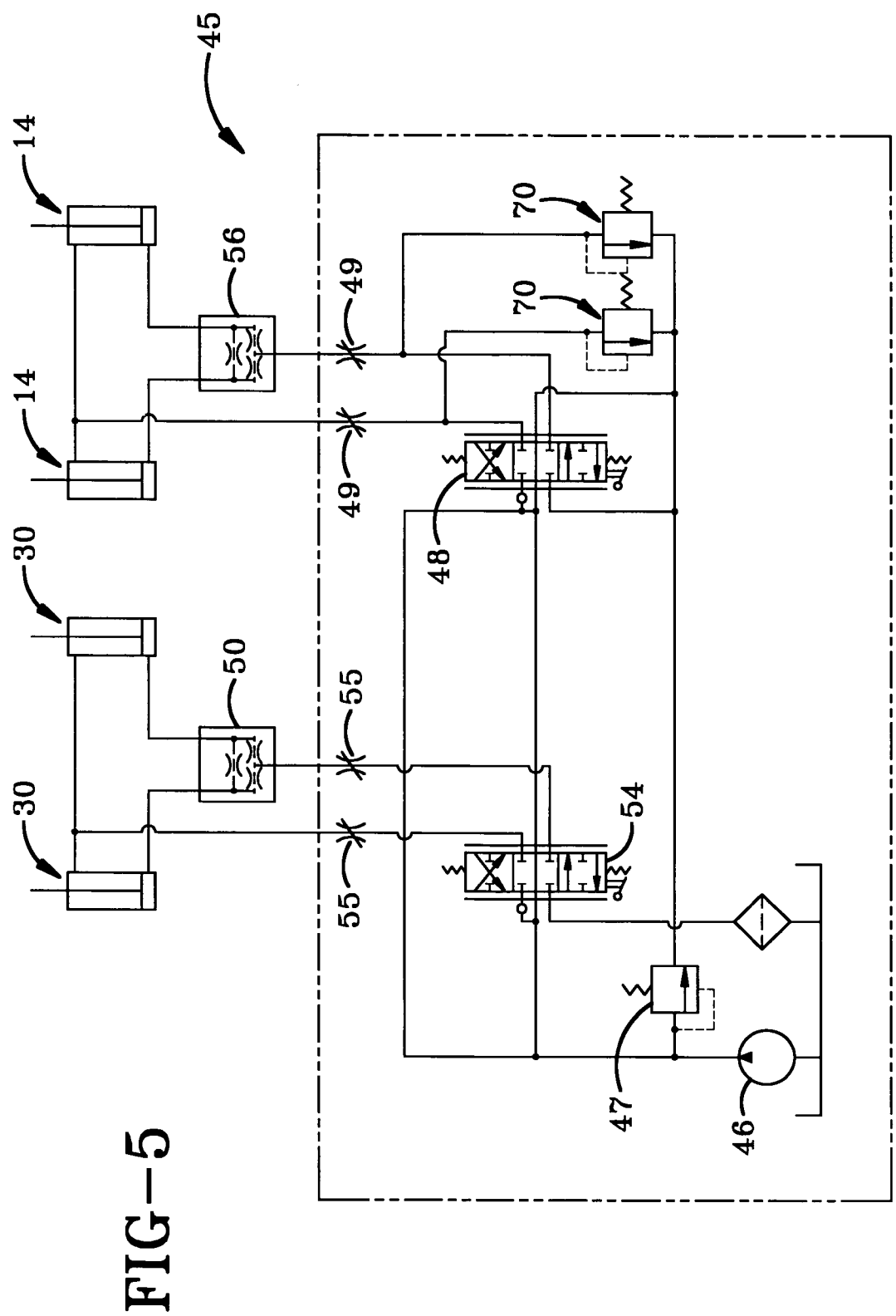
FIG. 5 is a schematic of the hydraulic circuit of the preferred embodiment of the tarpaulin system.

Referring now to FIG. 5, in the preferred embodiment hydraulic circuit 45 consists of a pump 46 and first and second control valves 54 and 48. First control valve 54 governs the extension and retraction of linkage actuators 30. Second control valve 48 governs the extension and retraction of second arms 14. Pump 46 provides hydraulic power to the circuit. Pump 46 may be driven by the engine of truck 11 or may be driven by a separate electric motor. A relief valve 47 regulates the maximum pressure in second arm 14 and linkage actuators 30. When control valve 48 is activated, the pressurized fluid passes through an optional flow restrictor 49, which limits flow and acts as a speed control. Optionally, fluid may also pass through a first divider/combiner valve 56, which may divide the flow to synchronize the extension of second arms 14. Movement of second arm 14 may also be synchronized by torsion member 27 and the tarpaulin. In a similar fashion, when control valve 54 is activated the fluid passes through flow restrictor 55 and subsequently through second divider/combiner valve 50 which divides the flow to synchronize the extension of linkage actuators 30. When control valve 48 is moved in the other direction, oil flows through restrictor valve 49 and to the rod end of second arms 14 to retract them. Oil forced out of the base end of second arms 14 is then combined in equal portions by first divider/combiner valve 56 such that second arms 14 remained synchronized. In like manner, linkage actuators 30 also stay synchronized, in retraction, when control valve 54 is actuated in the other direction. First divider/combiner valve 56 and second divider/combiner valve 50 also permit resynchronization at the end of the travel of second arms 14 and linkage actuators 30 respectively. In certain linkage positions, a stop in the linkage may limit the rotation allowed between first arm 16 and tarpaulin arm 15. Relief valve 47 will stop damage from occurring in these positions, but the linkage will cease to move. The optional port relief valves 70 will allow second arms 14 to extend or retract if the linkage is brought against the stops by the actuation of linkage actuator 30. Those skilled in the art will be familiar with other basic functions of hydraulic circuit 45.

Figure 6:
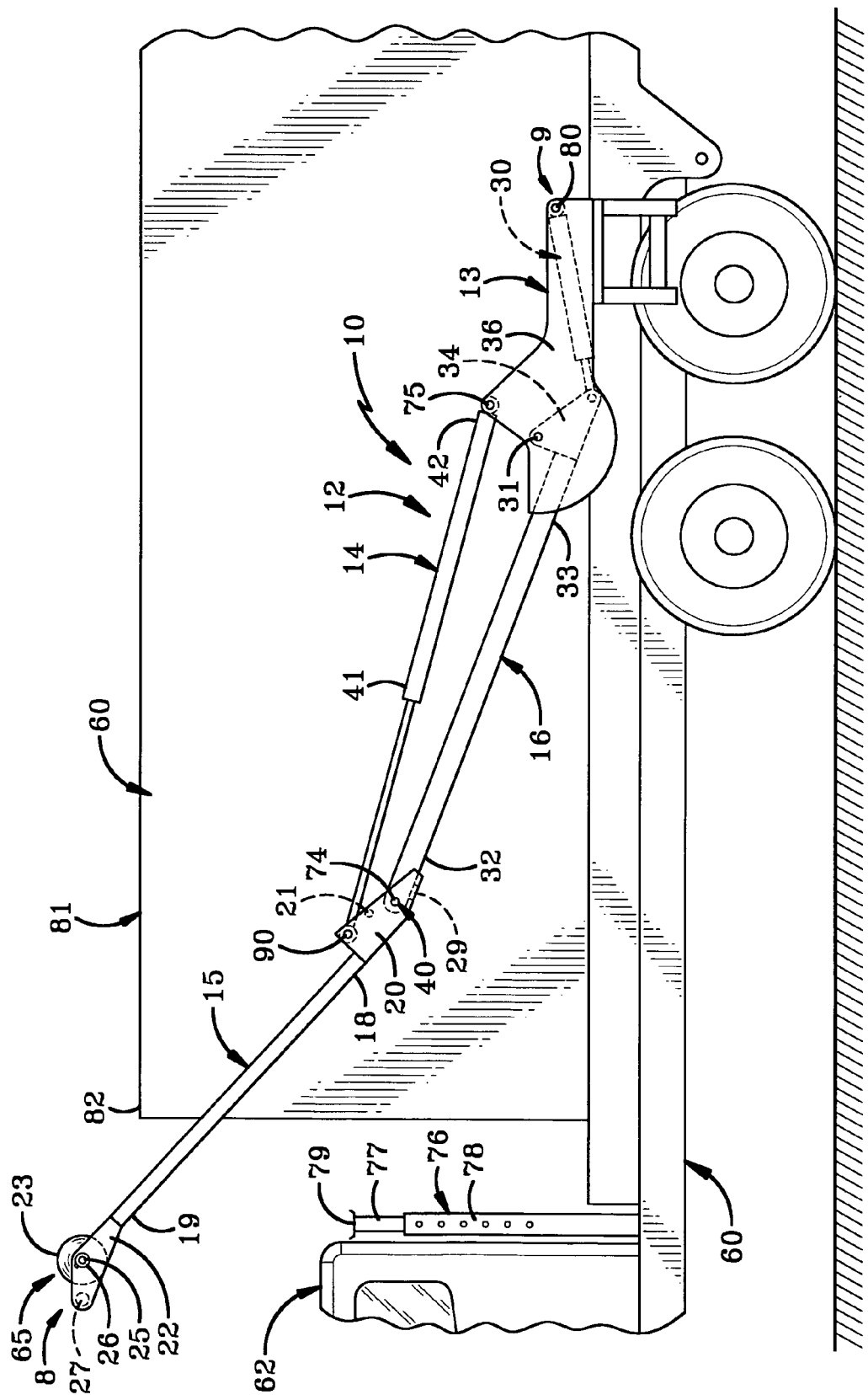
FIG. 6 is a side elevation view of the tarpaulin system mounted on the truck when a container is received thereon.

Referring now to FIG. 6, pivot plate 20 includes a set of stops. A retract stop 21 and extend stop 29 prevent tarpaulin arm 15 from over rotating or under rotating. As mentioned previously, each side assembly 12 comprises a four-bar linkage, composed of mounting base 13, first arm 16, second arm 14, and tarpaulin arm 15. As the four-bar linkage moves, both the linkage configuration and second arm 14 govern the motion of tarpaulin arm 15. This motion is discussed in more detail in association with FIGS. 7-9. As tarpaulin system 10 moves, pivot E and first arm 16 must be kept from going past a toggle position either way, such that second arm 14 loses its moment arm about pivot E. In order to reduce the demands on the operator, stop 21 limits the rotation of tarpaulin arm 15 in such a way as to eliminate the possibility of putting second arm 14 into toggle. In the preferred embodiment of tarpaulin system 10, stops 21 and 29 contact first arm 16 at appropriate points in the motion so as to limit the travel of first arm 16 in each respective direction. An alternative method is that when stops 21 or 29 contact first arm 16, second arm 14 is forced to extend or retract as the four-bar linkage moves in a generally arcuate path to cover or uncover container 60. The forced extension and retraction is accomplished by forcing the fluid from either head end 42 or rod end 41 of second arm 14. The fluid is allowed to leave second arm 14 and bypass control valve 48 when the pressure is sufficient to open optional port relief valves 70.

Figure 7:
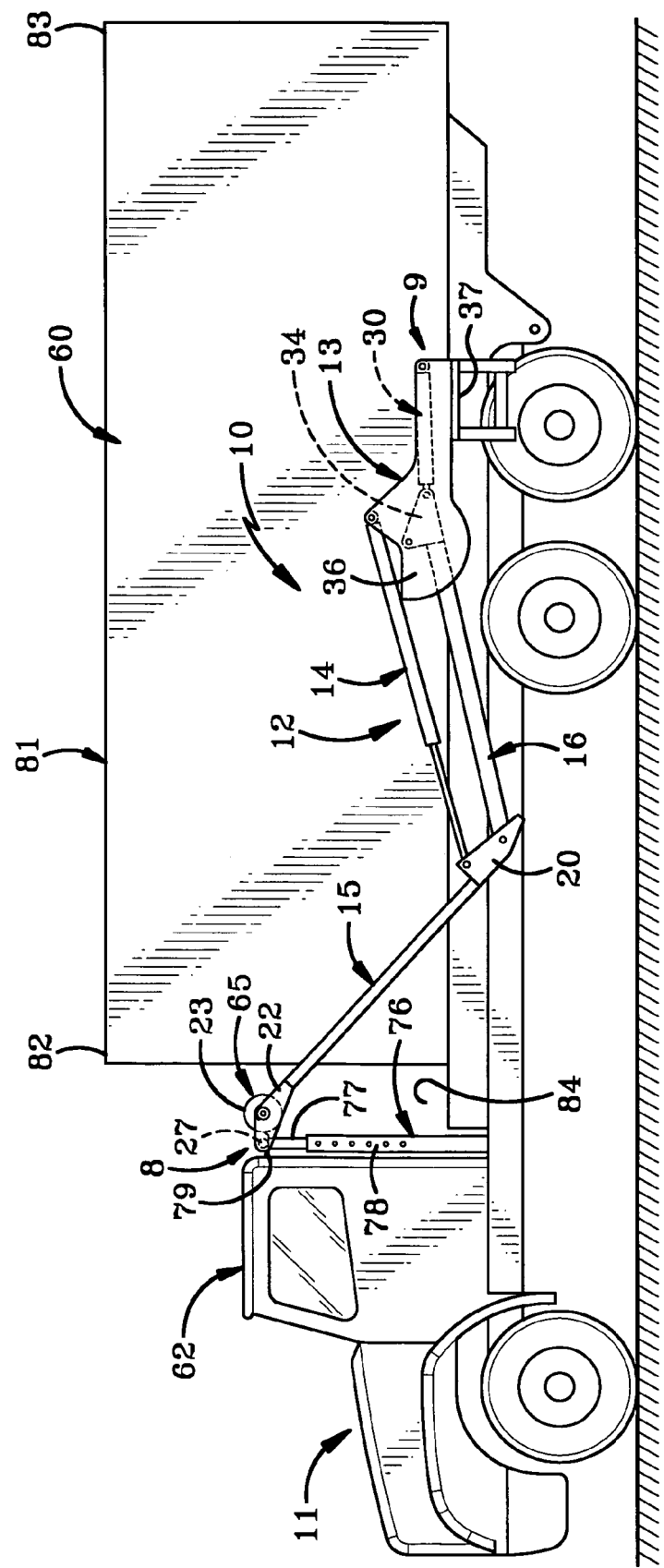
FIG. 7 is a side elevation view of the tarpaulin system with the tarpaulin roller in a stowed position.
Figure 8:
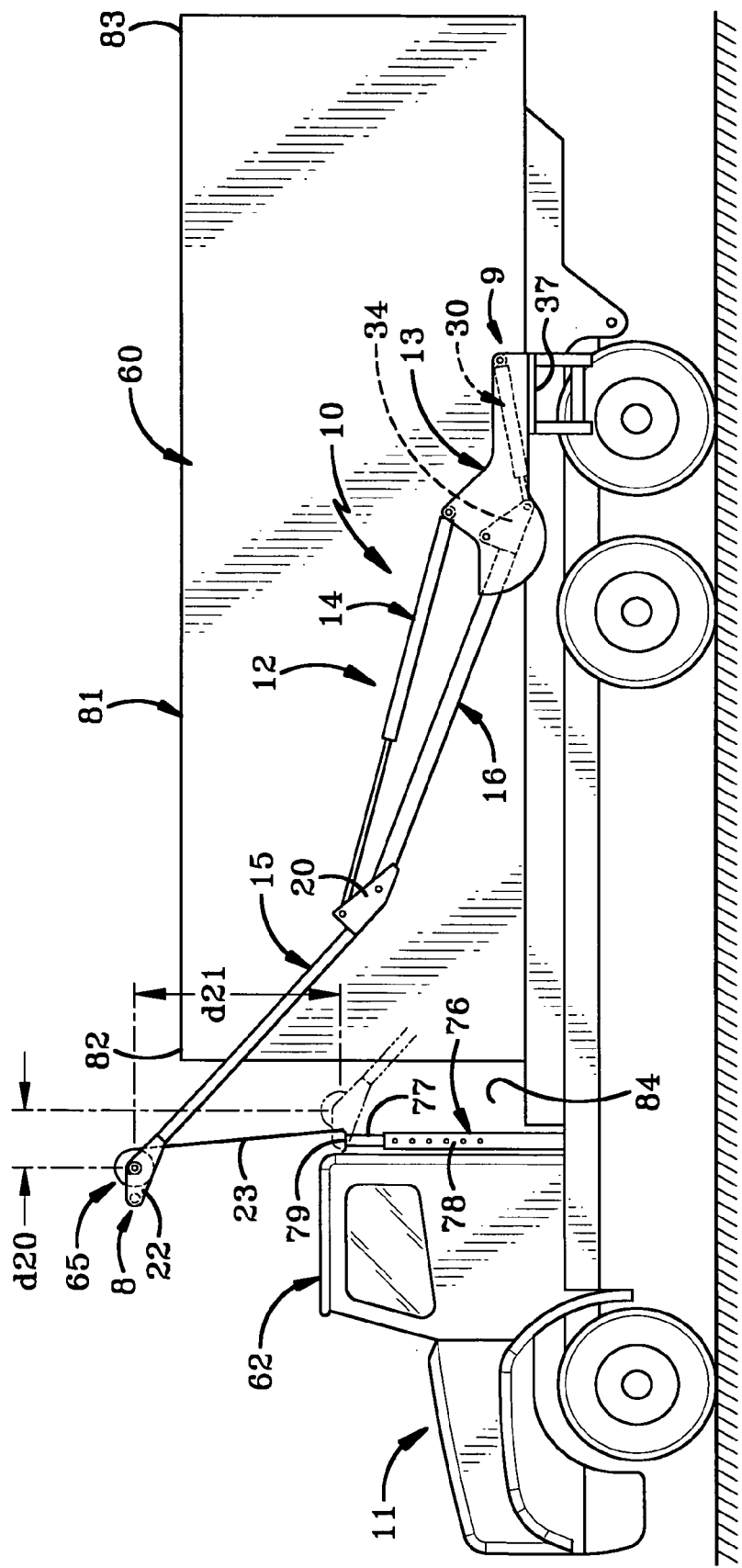
FIG. 8 is a side elevation view of the tarpaulin system with the tarp roller raised above the front of the container.
Figure 9:
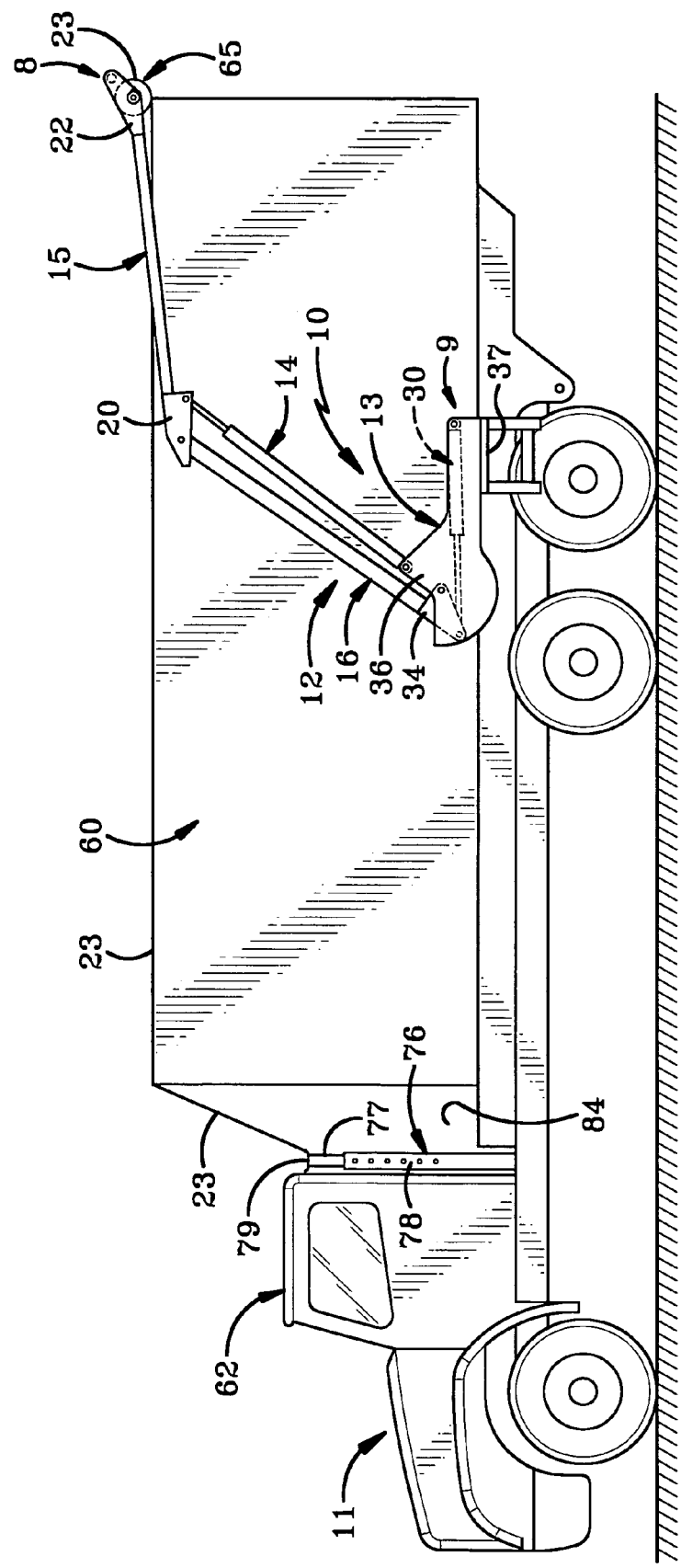
FIG. 9 is a side elevation view of the tarpaulin system with the tarp roller positioned proximate the rear top edge of the container.

The basic mode of operation of the present invention is described referring to FIGS. 7, 8, and 9. FIG. 7 depicts the tarpaulin system 10 of the present invention mounted on a roll-off truck 11. Open top container 60 is loaded onto truck 11 behind cab 62 and between arm assemblies 12 of system 10. Container 60 has top 81 which includes a front upper edge 82 and a rear upper edge 83. Cab 62 and container 60 define therebetween a tarpaulin-receiving space 84 in which roller assembly 65 and tarpaulin 23 are disposed in a stowed position below front upper edge 82 of container 60, adjacent the rear and top of cab 62 and preferably below the top of cab 62. The operator extends linkage actuator 30 to activate the four-bar linkage consisting of first arm 16, second arm 14, mounting base 13, and tarpaulin arm 15. The geometry of the linkage is such that the roll of tarpaulin 23 moves forwardly toward cab 62 and rises forwardly within space 84 between cab 62 and container 60 as shown in FIG. 8. The roll of tarpaulin 23 moves forwardly from its stowed position through a distance d20 and vertically through a distance d21 (FIG. 8). Tarpaulin 23 and roller assembly 65 are movable from the stowed position to a position near front upper edge 82 of container 60 by operating actuator 30 without extending or retracting second arm 14. This is useful in providing an automated initial step which prevents damage to cab 62, container 60, roller assembly 65 and other elements of system 10. The geometry of the linkage also allows tarpaulin 23 to move in a forward direction from the stowed position simply by operating the actuator. When the roll of tarpaulin 23 is near top 81 of container 60, second arm 14 and linkage actuator 30, which are independently operable, can be manipulated to draw tarpaulin 23 over top 81 of container and position the remaining portion of the roll of tarpaulin 23 in a deployed position at or adjacent rear top edge 83 of container 60. As a consequence, the entire open top 81 of container is covered as shown in FIG. 9. Various combinations of linkage actuator 30 and second arm 14 enable roll of tarpaulin 23 to be positioned at the rear top edge of virtually all common container sizes.

In this manner tarpaulin system 10 will set roller assembly 65 and consequently tarpaulin 23 directly onto container 60 near the rear portion thereof in order to assure that the top of container 60 remains entirely covered without adding undue strain to tarpaulin 23 as a result of wind whip and the like. Additionally, the operation of actuator 30 and second arm 14 ensures that actuator arms 15 and 16 will remain positioned below the top of container 60 to prevent damage to arms 15 and 16 from overhanging objects such as tree limbs as the truck 11 travels around.

Figure 10:
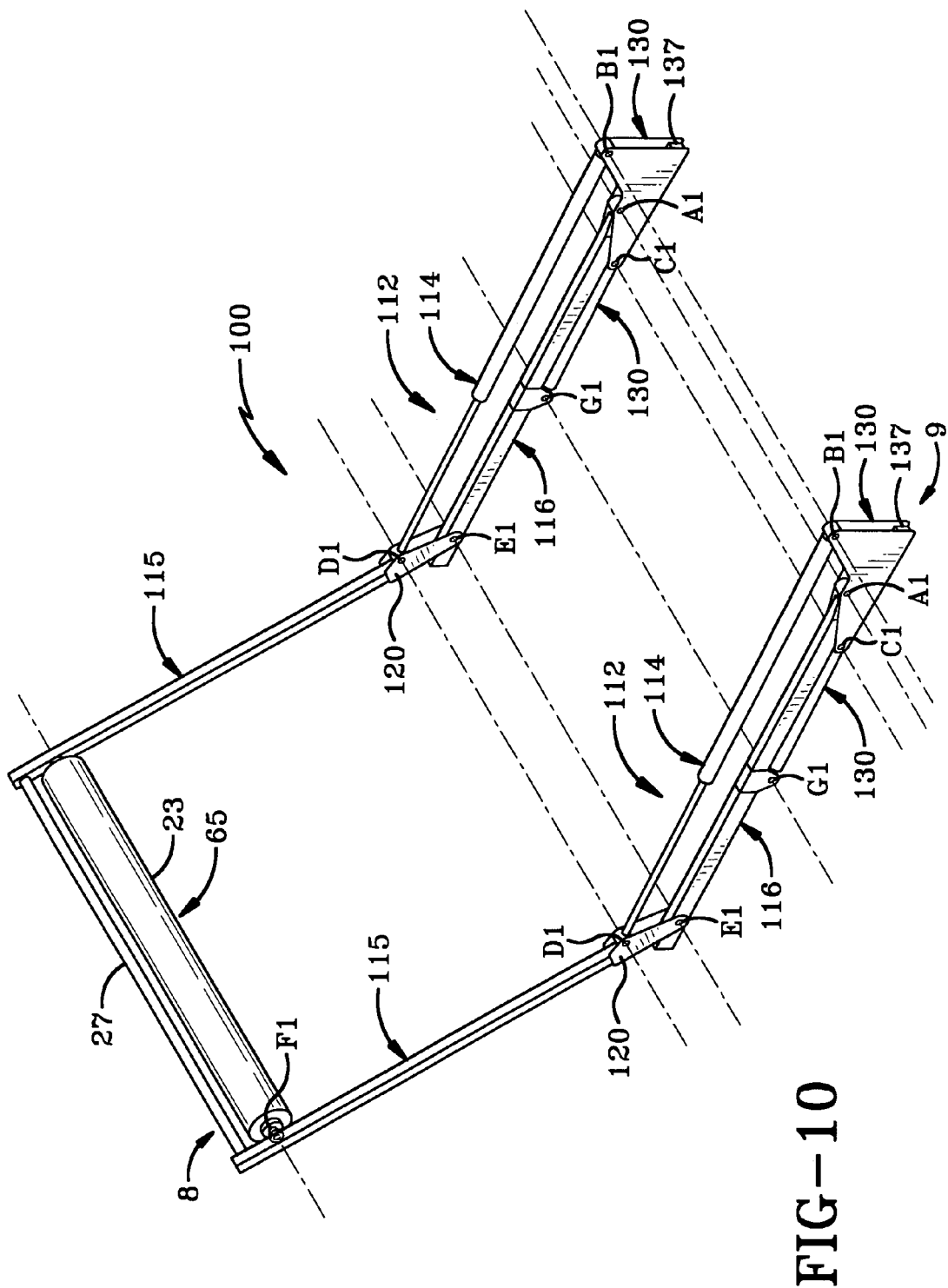
FIG. 10 is a side elevation view of a second embodiment of the tarpaulin system of the present invention.

Referring to FIG. 10, there is shown a second embodiment of tarpaulin system in accordance with the present invention and generally indicated at 100. System 100 is substantially similar to system 10 with the primary difference being a differently configured mounting base 113 and a linkage actuator 130 which is positioned differently to provide enhanced leverage for the operation of the four-bar linkage of system 100.

System 100 includes a pair of side assemblies 112, each including a mounting base 113, a first arm 116, a second arm 114, a tarpaulin arm 115, a tarpaulin-deploying assembly in the form of a roller assembly 65 and a linkage actuator 130 (FIG. 3).

Figure 11:
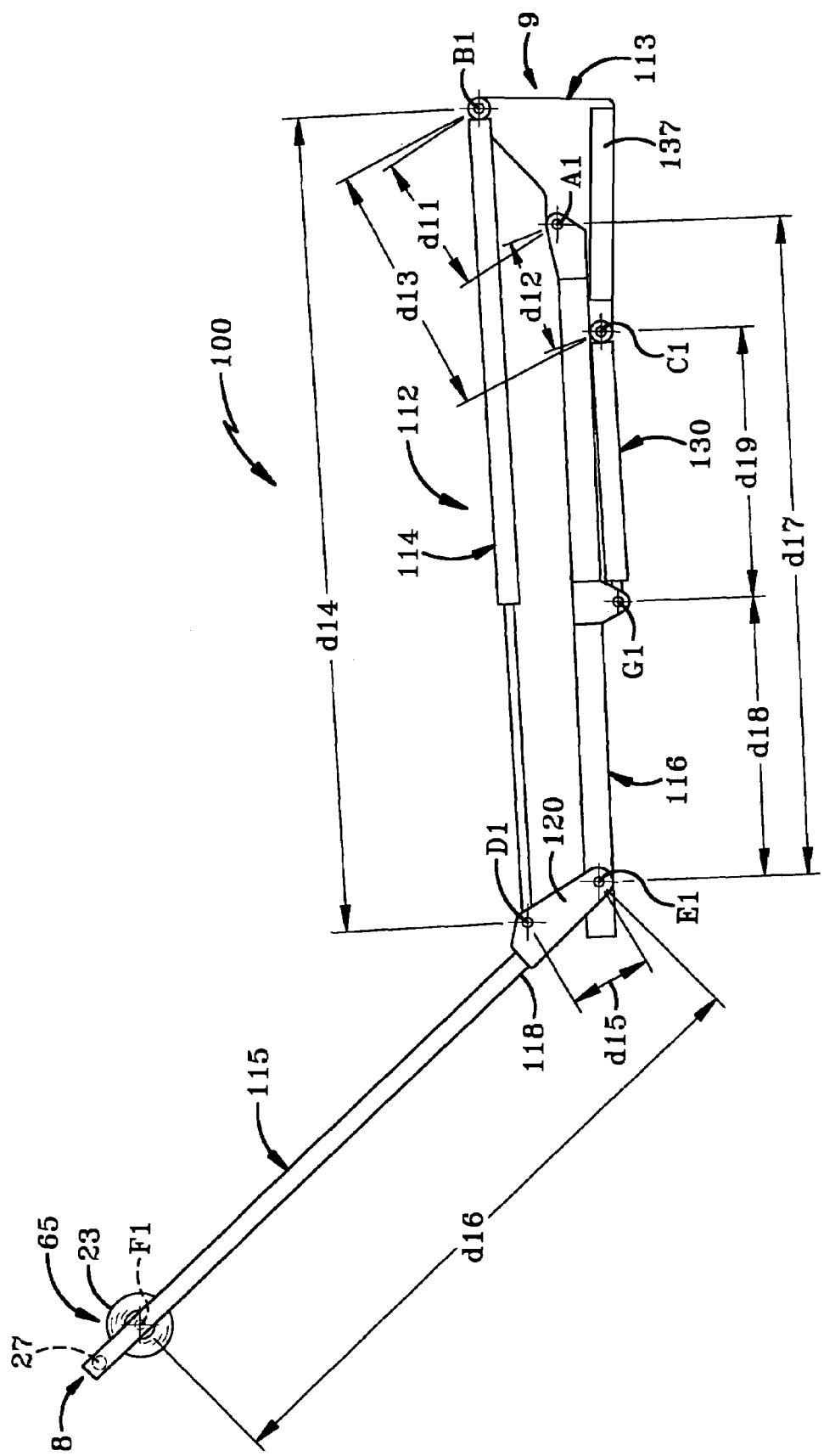
FIG. 11 is a side elevation view of the tarpaulin system of FIG. 10 in a stowed position.

Referring now to FIGS. 10 and 11, first arm is pivotally connected to mounting base 113 at a first pivot A1, second arm is pivotally connected to mounting base 113 and a second pivot B1 and linkage actuator 130 is pivotally connected to mounting base 113 at base pivot C1. Unlike system 10, first pivot A1 is disposed intermediate second pivot B1 and sixth C1. First and second pivots A1 and B1 are disposed a fixed distance d11 apart. First and base pivots A1 and C1 are disposed a fixed distance d12 apart. Second and base pivots B1 and C1 are disposed a fixed distance d13 apart.

Tarpaulin arm 115 and second arm 114 are pivotally connected at a fourth pivot D1. Second and fourth pivots, B1 and D1 are disposed a variable distance d14 apart due to the extendable and retractable nature of second arm 114. Thus, pivot D1 is movable toward and away from pivot B1. Tarpaulin arm 115 is also pivotally connected to first arm 116 at a third pivot E1. Third and fourth pivots E1 and D1 are disposed a fixed distance d15 apart. The tarpaulin roller 65 is mounted at axis F1 to tarpaulin arm 115. Axis F1 and third pivot E1 are disposed a fixed distance d16 apart, which distance is substantially larger than distance d15. Thus, second pivot D1 is disposed intermediate third pivot E1 and F1.

First arm 116 is pivotally mounted to linkage actuator 130 at actuator pivot G1. First and third pivots A1 and E1 are disposed a fixed distance d17 apart and third pivot E1 and actuator pivot G1 are disposed a fixed distance d18 apart. Distance d18 is substantially shorter than fixed distance d17, being a little less than ½ of distance d17. Unlike system 10, actuator pivot G1 is disposed intermediate third pivot E1 and first pivot A1. Actuator pivot G1 is disposed a variable distance d19 from base pivot C1 because of the extendable and retractable nature of linkage actuator 130. Thus, actuator pivot G1 is movable toward and away from base pivot C1.

Tarpaulin arm 115 and first arm 116 are long tubular members. A pivot plate 120 is rigidly connected to a first end 118 of tarpaulin arm 115. Pivot plate 120 is pivotally connected to second arm 114 at fourth pivot D1 and pivotally connected to first arm 116 at third pivot E1.

Referring now to FIG. 11, it is noted that the pivotal connections as described with regard to system 10 are substantially the same as with system 100 and are therefore not further described except for the distinctions therebetween. The main difference that system 100 has with respect to system 10 is that system 100 includes a mounting base 113 having a different configuration. More particularly, mounting base 113 is substantially triangular and base pivot C1 is located adjacent a forward end of mounting base 113. Second pivot B1 is located adjacent a rear end of mounting base 113, which is also rear end 9 of system 100, the tarpaulin and roller assembly 65 being adjacent a forward end 8 of system 100. As previously noted, the different location of base pivot C1 in comparison to base pivot C of system 10 changes the configuration so that first pivot A1 is disposed intermediate second and base pivots B1 and C1. As also previously noted, actuator pivot G1 is disposed intermediate first and third pivots A1 and E1 and is approximately halfway therebetween. Actuator 130 is pivotally connected at the base pivot C1 and actuator pivot G1 and extends forward from base pivot C1 when actuator 130 is in a retracted position. This corresponds to the stowed position of the tarpaulin 23 and roller assembly 65.

Figure 12:
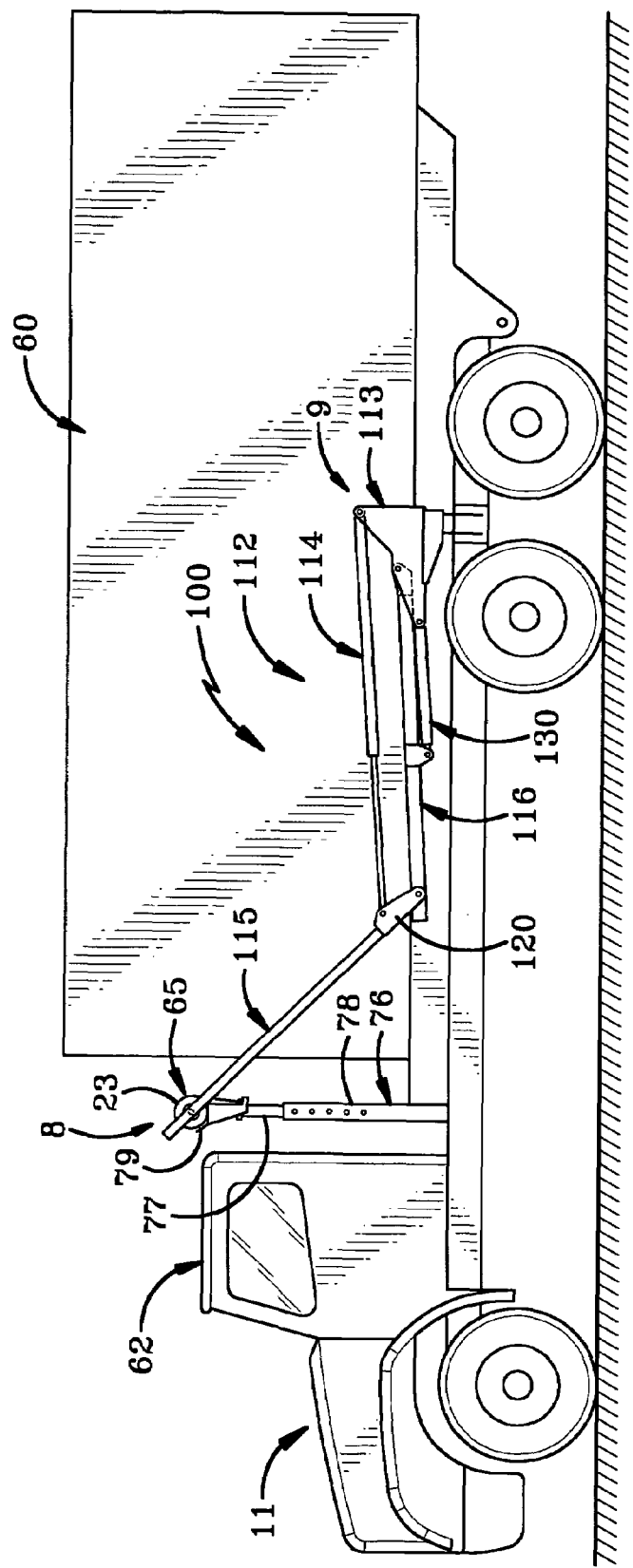
FIG. 12 is a side elevation view of the tarpaulin system of FIG. 10 with the tarp roller raised above the front top edge of the container.
Figure 13:
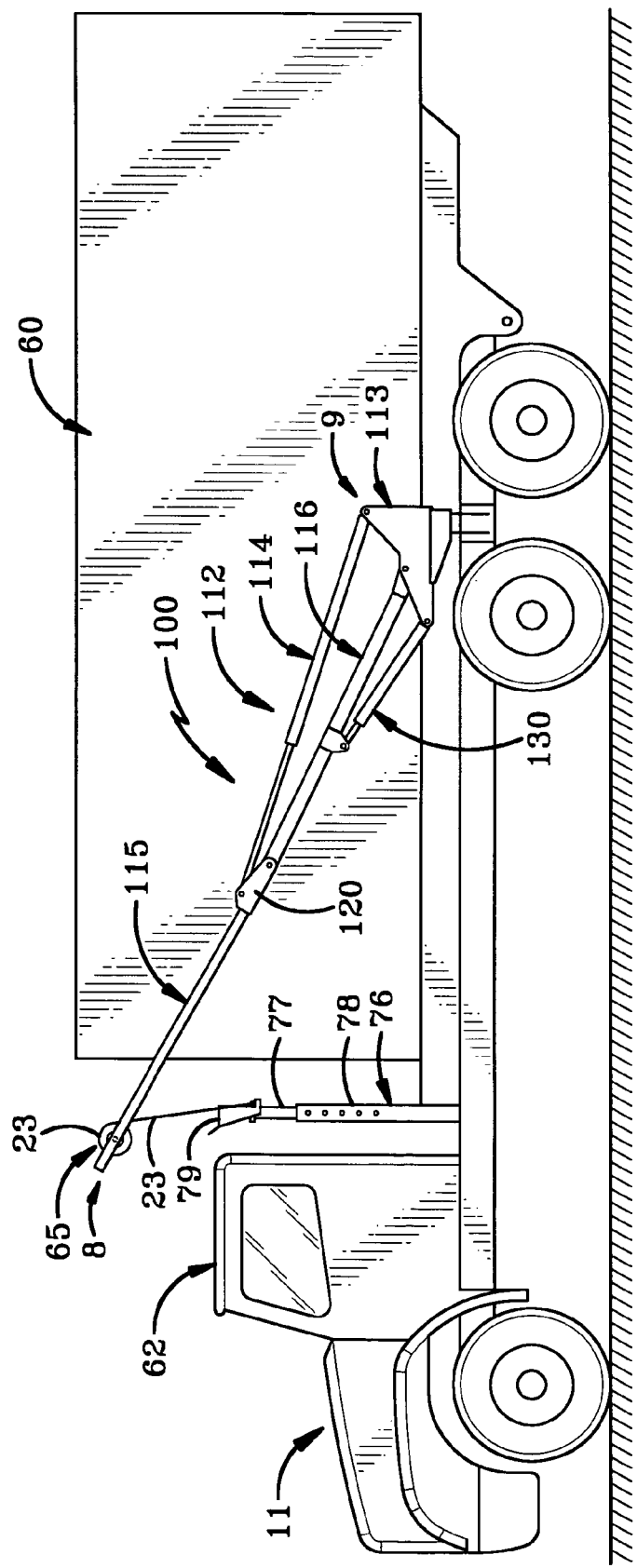
FIG. 13 is a side elevation view of the tarpaulin system of FIG. 10 with the tarp roller positioned proximate the rear top edge of the container.
Figure 14:
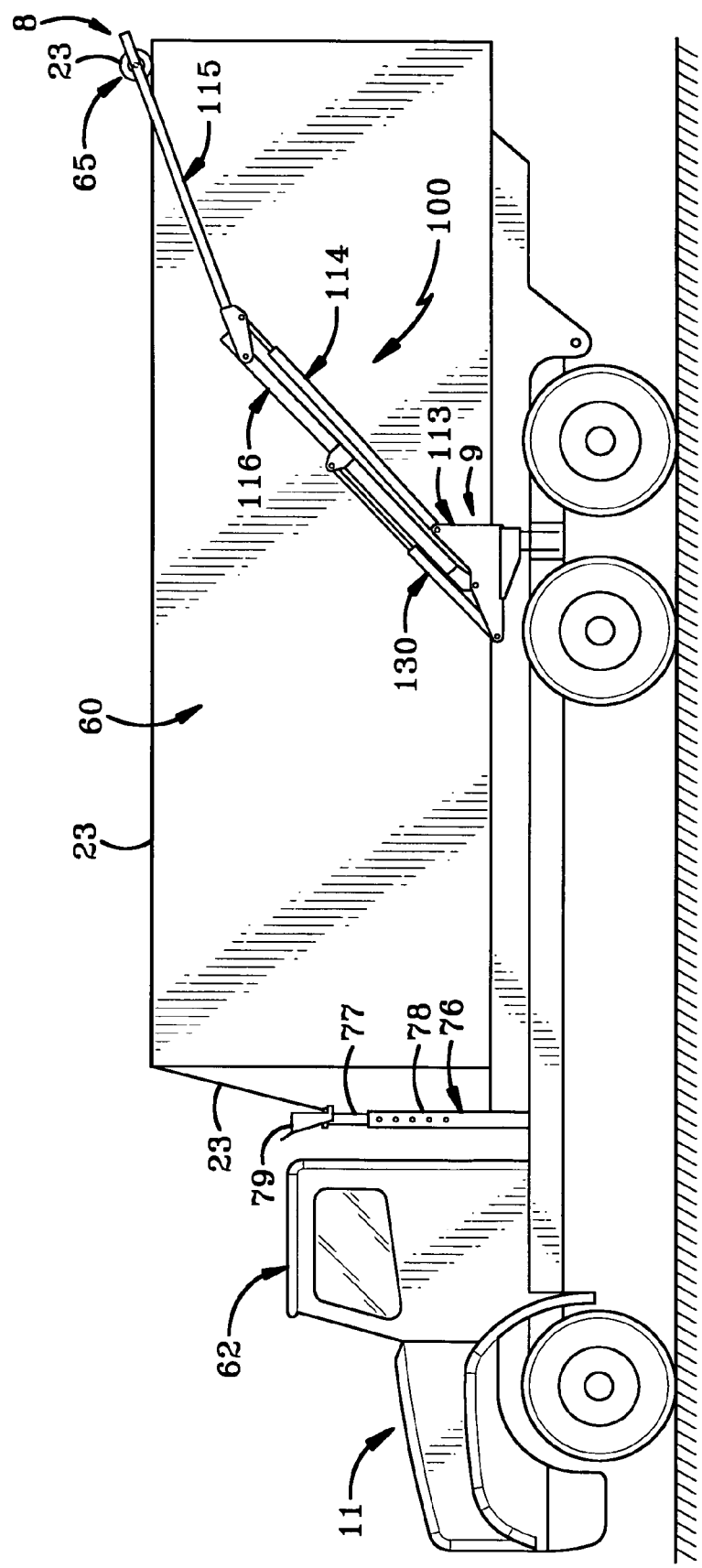
FIG. 14 is a side elevation view of the tarpaulin system of FIG. 10 with the tarp roller positioned proximate the rear top edge of the container.

With reference to FIGS. 12-14, the operation of system 100 is substantially as described with regard to system 10. It is emphasized that the operation of actuator 130 without the extension or retraction of second arm 114 allows roller assembly 65 with tarpaulin 23 mounted thereon to move from the stowed position adjacent tray 79 to a position near front upper edge 82 of container 60. In addition, this sole operation of actuator 130 moves roller assembly 65 and tarpaulin 23 in a forward direction away from container 60 and generally toward cab 62 of truck 11. This ensures that the automatic operation of actuator 130 by itself will allow the roller assembly and tarpaulin 23 to clear front upper edge 82 of container 60 without any manual control by the operator of system 100. The operator of system 100 then controls one or more of actuator 130 and second arm 114 to move the roller assembly 65 rearward and to entirely cover the open top 81 of container 60. As previously noted, control via actuator 130 and second arm 114 allows the operator if necessary to keep the roller assembly 65 closely adjacent the top 81 of container 60 in order to minimize the negative effects of winds on the tarpaulin 23 as it is being deployed.

It will be understood that the tarpaulin roll is moved back toward the container over the top thereof by way of one of the first linear actuator, the second linear actuator; and both the first and second linear actuators.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A tarpaulin system comprising:
   a pair of side assemblies, each side assembly comprising
   a mounting base;
   a first arm;
   a second arm;
   a first pivot for pivotally mounting the first arm to the mounting base;
   a second pivot for pivotally mounting the second arm to the mounting base;
   a tarpaulin arm;
   a third pivot for pivotally mounting the tarpaulin arm to the first arm;
   a fourth pivot for pivotally mounting the tarpaulin arm to the second arm; and
   a tarpaulin carried by the tarpaulin arm.

2. The system as defined in claim 1 wherein the second and fourth pivots are movable toward and away from one another.

3. The system as defined in claim 2 wherein the second arm has a length and the length is adjustable.

4. The system as defined in claim 3 wherein the second arm is a first actuator for pivoting the tarpaulin arm about the third pivot.

5. The system as defined in claim 4 in which the second arm is positioned above the first arm.

6. The system as defined in claim 4 further comprising:
   a tarpaulin roll positioned intermediate the side assemblies and carried by the tarpaulin arms;
   the tarpaulin mounted on the tarpaulin roll carried by the tarpaulin arms; and wherein the fourth pivot is positioned intermediate the third pivot and the tarpaulin roll.

7. The system as defined in claim 2 wherein the first and second pivots are spaced apart a fixed distance; and wherein the third and fourth pivots are spaced apart a fixed distance.

8. The system as defined in claim 1 wherein the tarpaulin arm has an axis which is co-linear with the tarpaulin roll and which is substantially parallel to the third and fourth pivots; and wherein the tarpaulin is windingly mounted about the axis of the tarpaulin arm.

9. The system as defined in claim 1 wherein the first arm has an actuator pivot substantially parallel to the first and third pivots; and wherein the third pivot and actuator pivot are movable about the first pivot.

10. The system as defined in claim 9 further comprising:
a base pivot carried by the mounting base; and
a first actuator extending between the actuator pivot carried by the first arm and the base pivot.

11. The system as defined in claim 10 wherein the first actuator is pivotally connected to the first arm at the actuator pivot thereof for rotating the first arm about the first pivot.

12. The system as defined in claim 10 wherein the actuator pivot of the first arm is positioned intermediate the first and third pivots.

13. The system as defined in claim 10 in which the actuator pivot is positioned rearward of the first pivot.

14. The system as defined in claim 12 in which the first actuator has a collapsed position where the tarpaulin roll is in a first position, and in which the second actuator can be moved to an expanded position where the tarpaulin roll is forward of the first position.

15. A process for covering an open top container comprising:
positioning a tarpaulin roll forward of the container and below the top thereof; and
moving the tarpaulin roll forward of the container and upwardly toward the top of the container; and
in which the step of moving further includes the step of actuating an arm assembly positioned on either side of the container by way of a first linear actuator associated with each arm assembly;
moving the tarpaulin roll back toward the container over the top thereof with one of the first linear actuator, a second linear actuator and both the first and second linear actuators.

16. The process as defined in claim 15 in which one of the first and second actuators is expanded to move the tarpaulin roll over the container and the other is retracted to move the tarpaulin roll over the container.

17. A tarpaulin system movable between a stowed-position and a deployed position, the system comprising:
a pair of arm assemblies, each assembly comprising:
a four-bar linkage wherein the four bars are interconnected at four pivotal connections which define a four-sided geometric shape;
a first actuator for moving at least one of the four bars to alter the geometric shape; and
a tarpaulin mounted on the four-bar linkage wherein the tarpaulin is adapted to move between the stowed position and the deployed position.

18. The tarpaulin system as defined in claim 17 in which one bar of the four bar linkage is an adjustable bar.

19. The tarpaulin system as defined in claim 18 in which the adjustable bar is moveable separately from the actuator.

20. The tarpaulin system as defined in claim 19 in which the adjustable bar is a second actuator.

21. The tarpaulin system of claim 17 wherein the tarpaulin is movable in a forward direction from the stowed position simply by operating the first actuator.

22. The system of claim 1 wherein the third and fourth pivots are carried by the tarpaulin arm.

23. The system of claim 22 wherein the first and second pivots are carried by the mounting base.

24. The system of claim 1 wherein each of the first, second and tarpaulin arms is pivotable relative to the other of the arms and relative to the mounting base; and further comprising a fifth pivot carried by the first arm; and a first actuator pivotally connected to the first arm at the fifth pivot for pivoting the first arm about the first pivot.

25. The system of claim 24 wherein the second arm is extendable and retractable.

26. The system of claim 25 wherein the second arm is a second linear actuator for pivoting the tarpaulin arm about the third pivot.

27. The system of claim 1 further comprising a tarpaulin roll intermediate the side assemblies and carried by the tarpaulin arms; and wherein the tarpaulin is mounted on the tarpaulin roll; the side assemblies are movable between a stowed position in which the tarpaulin roll is forward of the mounting base and a deployed position in which the tarpaulin roll is rearward of the mounting base; and in the stowed position the tarpaulin arm in its entirety is disposed forward of the mounting base.

28. The system of claim 1 further comprising a tarpaulin roll intermediate the side assemblies and carried by the tarpaulin arms; and wherein the tarpaulin is mounted on the tarpaulin roll; the side assemblies are movable between a stowed position in which the tarpaulin roll is forward of the mounting base and a deployed position in which the tarpaulin roll is rearward of the mounting base; in the stowed position the first and second arms extend forward respectively from the first and second pivots respectively toward the third and fourth pivots, and the tarpaulin arm extends forward from adjacent the third and fourth pivots to the tarpaulin roll; and in the deployed position the first and second arms extend rearward respectively from the first and second pivots respectively toward the third and fourth pivots, and the tarpaulin arm extends rearward from adjacent the third and fourth pivots to the tarpaulin roll.

29. The system of claim 28 wherein the third pivot is lower than at least one of the first and second pivots in the stowed position.

30. The system of claim 15 wherein the step of moving the tarpaulin roll forward of the container and upwardly toward the top of the container comprises simultaneously moving the tarpaulin roll forward of the container and upwardly toward the top of the container.

31. The system of claim 17 further comprising a fifth pivotal connection on the first arm; and wherein the first actuator is pivotally connected to the first arm at the fifth pivotal connection for pivoting the first arm about the first pivot.

* * * * *